(12) United States Patent
Kobayashi et al.

(10) Patent No.: US 8,791,925 B2
(45) Date of Patent: Jul. 29, 2014

(54) COORDINATE INPUT APPARATUS, CONTROL METHOD THEREFOR AND PROGRAM

(75) Inventors: Katsuyuki Kobayashi, Yokohama (JP); Yuichiro Yoshimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 276 days.

(21) Appl. No.: 13/284,079

(22) Filed: Oct. 28, 2011

(65) Prior Publication Data
US 2012/0113057 A1    May 10, 2012

(30) Foreign Application Priority Data
Nov. 4, 2010   (JP) .................................. 2010-247838

(51) Int. Cl.
G06F 3/042    (2006.01)
(52) U.S. Cl.
CPC .................................. *G06F 3/0421* (2013.01)
USPC .......................................... 345/175; 345/173
(58) Field of Classification Search
None
See application file for complete search history.

(56) References Cited

U.S. PATENT DOCUMENTS

| 4,507,557 | A | 3/1985 | Tsikos |
| 7,113,174 | B1 * | 9/2006 | Takekawa et al. ............ 345/173 |
| 7,443,387 | B2 * | 10/2008 | Tanaka et al. ................. 345/173 |

FOREIGN PATENT DOCUMENTS

| JP | 2001-043021 A | 2/2001 |
| JP | 2003-280802 A | 10/2003 |
| JP | 2004-192065 A | 7/2004 |
| JP | 2004-272353 A | 9/2004 |
| JP | 4118664 B2 | 7/2008 |

* cited by examiner

*Primary Examiner* — Joseph Haley
(74) *Attorney, Agent, or Firm* — Carter, DeLuca, Farrell & Schmidt, LLP

(57) ABSTRACT

A coordinate input apparatus includes retroreflecting units at two opposite sides of a rectangular-shaped coordinate input effective region, and a plurality of sensor units provided at the two sides. Each of the sensor units includes a light receiving unit for receiving light that reaches the light receiving unit, a light projecting unit for projecting light toward a retroreflecting unit provided at one of the two sides, which opposes the light projecting unit, and a surface light emitting unit for emitting even diffused light from a band-shaped surface. Each of the sensor units simultaneously detects, by the light receiving unit, light that has been projected by the light projecting unit and reflected back by the retroreflecting unit at the side opposing the light projecting unit, and light that has been emitted by surface light emitting units of a plurality of sensor units at the side opposing the light projecting unit.

11 Claims, 13 Drawing Sheets

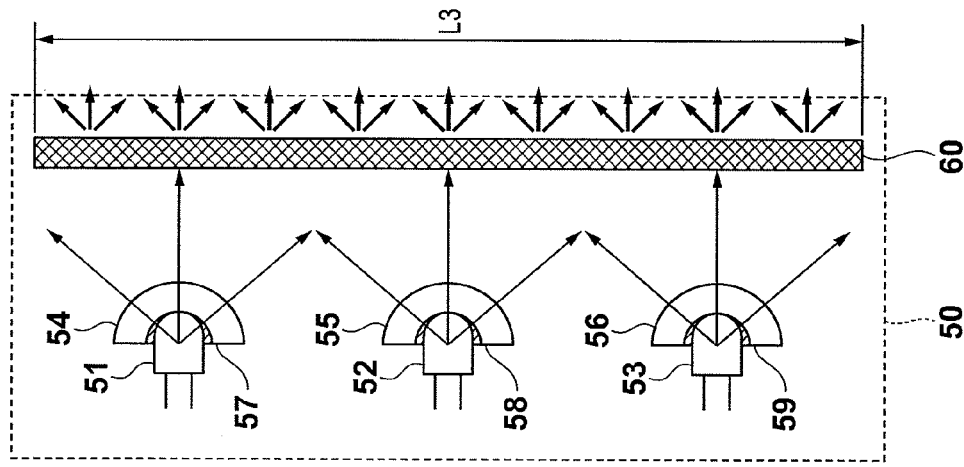
FIG. 2D
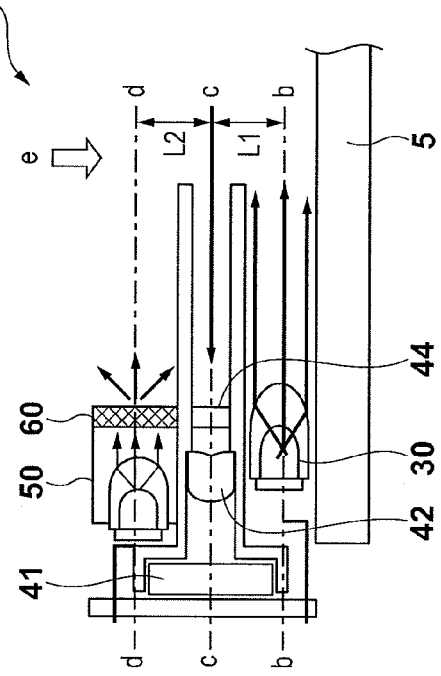
FIG. 2A
FIG. 2B
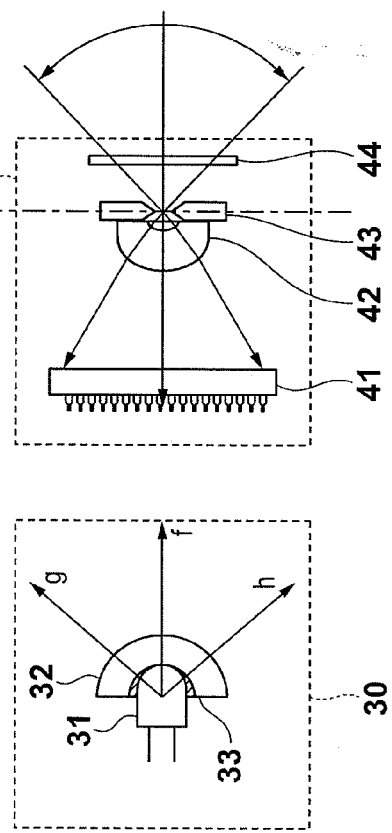
FIG. 2C

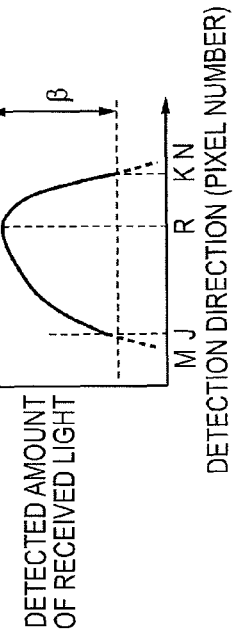
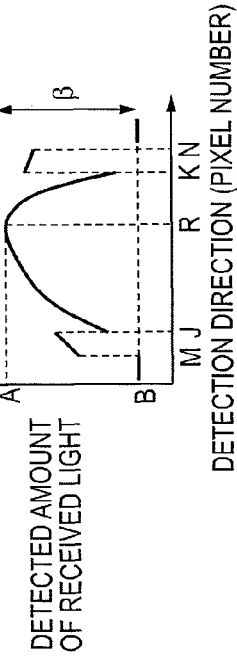
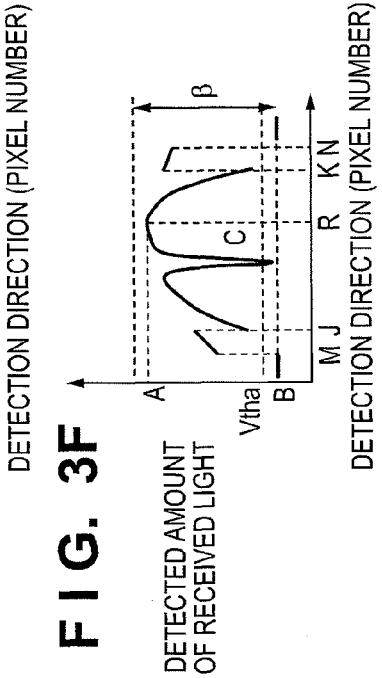
FIG. 3A
FIG. 3B
FIG. 3C
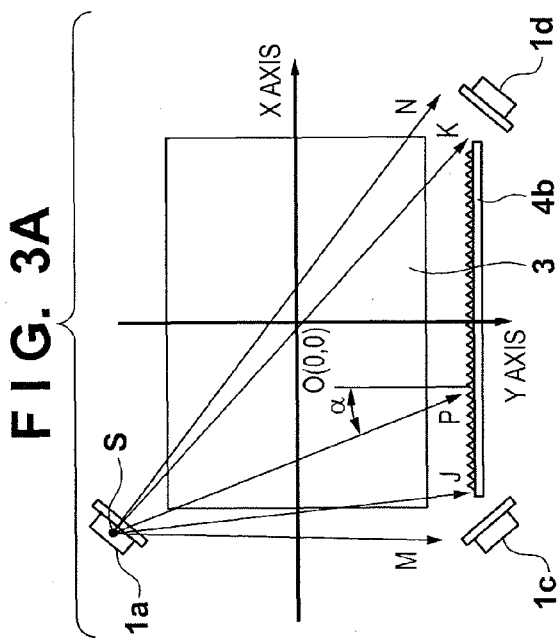
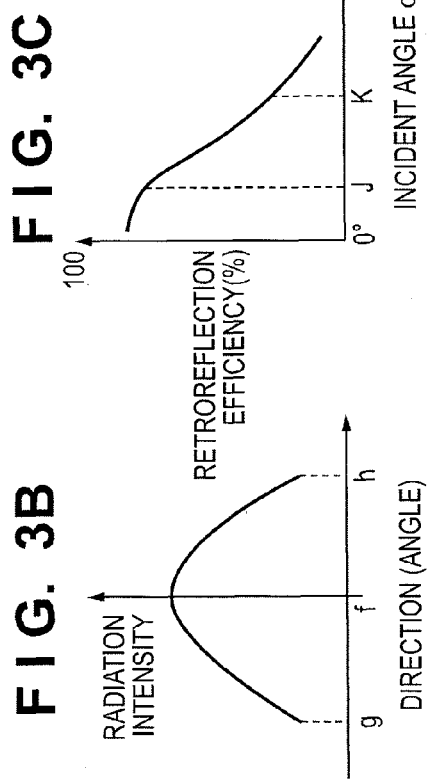
FIG. 3D
FIG. 3E
FIG. 3F

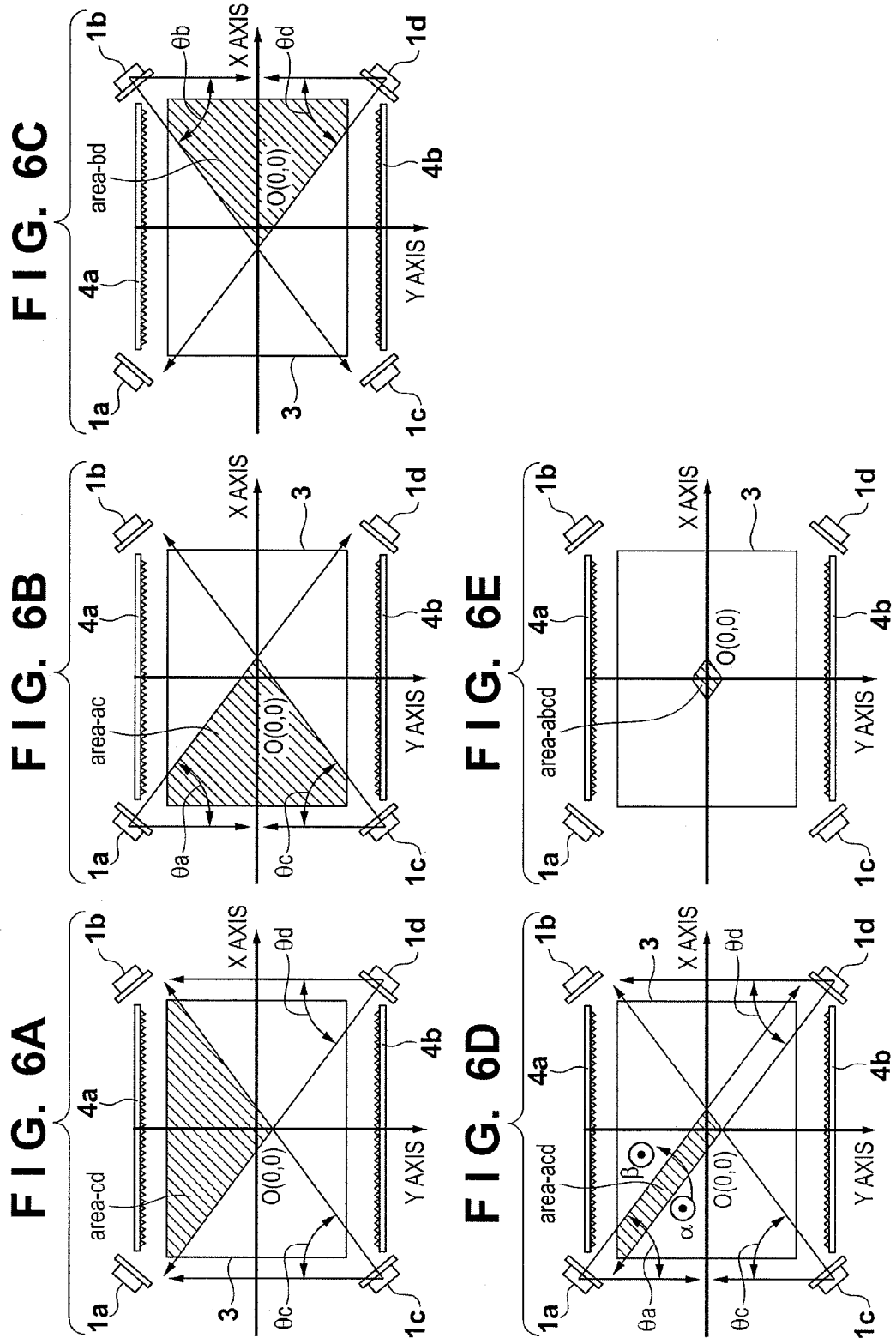

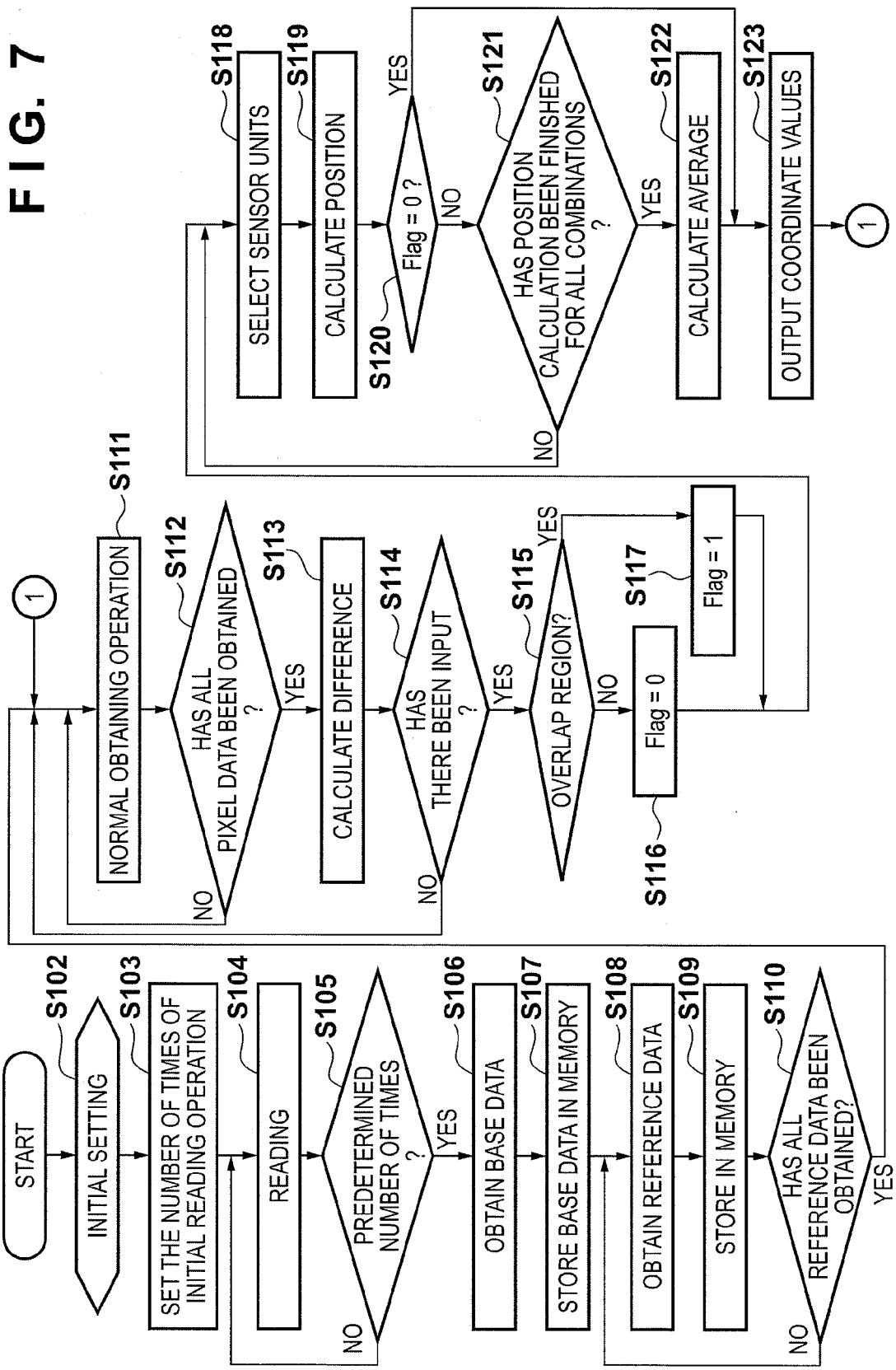

CONVENTIONAL ART

CONVENTIONAL ART

CONVENTIONAL ART

COORDINATE INPUT APPARATUS, CONTROL METHOD THEREFOR AND PROGRAM

BACKGROUND OF THE INVENTION

1. Field of the Invention

The present invention relates to a coordinate input apparatus that optically detects a coordinate position that has been input on a coordinate input face with a pointer such as a finger in order to input or select information, a control method therefor and a program. In particular, the present invention relates to a detachable portable coordinate input apparatus, a control method therefor and a program.

2. Description of the Related Art

Conventionally, as a coordinate input apparatus as described above, coordinate input apparatuses (touch panel, digitizer and the like) employing various systems have been proposed or commercialized. For example, coordinate input apparatuses such as a touch panel, with which operation of an information processing apparatus such as a personal computer (PC) can be easily performed by touching a screen with a finger without using any special devices, are widely used.

There are various types of coordinate input systems for such coordinate input apparatuses, including a method using a resistance film, a method using ultrasonic waves, and the like. A method is known as a coordinate input method that uses light in which a retroreflecting member is provided on the outside of the coordinate input face, light from a light projecting unit is reflected by the retroreflecting member, and the light amount distribution of the reflected light is detected by a light receiving unit. In this method, a light path is blocked by pointing a position in the coordinate input region with a pointer such as a finger, and a pointed position is calculated by detecting the direction in which light is blocked (for example, see U.S. Pat. No. 4,507,557, Japanese Patent Laid-Open No. 2004-272353).

A configuration example obtained by generalizing the configuration disclosed in U.S. Pat. No. 4,507,557 is shown in FIG. 10. FIG. 10 shows sensor units 1L and 1R disposed on both sides of the coordinate input face, and a coordinate input effective region 3 that serves as a coordinate input face used to input coordinates. In addition, a retroreflecting member 4 that surrounds three sides of the coordinate input effective region 3 so as to reflect back incident light in the direction opposite to the incident direction is included.

The sensor units 1L and 1R each include a light projecting unit and a light receiving unit (not shown in the drawings). The light projecting unit irradiates the input face of the coordinate input effective region 3 with light that spreads substantially in parallel to the input face in a fan-like form. The light receiving unit receives returned light that has been reflected back by the retroreflecting member 4. The coordinate input apparatus can calculate the coordinate position input in the coordinate input effective region 3 based on the directions in which light is blocked (blocking angles θL and θR) detected by the two sensor units 1L and 1R and the distance between the sensor units 1L and 1R. Note that in FIG. 10, reference numeral 2 indicates a control circuit that controls the sensor units 1L and 1R, processes obtained signals output from the sensor units 1L and 1R, or outputs results of the processing to an external apparatus. Reference numeral 8 indicates a light-transmitting protection member for protecting the retroreflecting member 4.

Japanese Patent Laid-Open No. 2004-272353 discloses a specific configuration example of the light projecting unit and the light receiving unit in the sensor unit of the coordinate input apparatus employing an optical light-blocking system that is disclosed in U.S. Pat. No. 4,507,557.

In the configuration disclosed in Japanese Patent Laid-Open No. 2003-280802, a light guiding unit that is provided surrounding three sides of the coordinate input effective region and emits light to the side face that is substantially perpendicular to the light-guiding direction is shown instead of the retroreflecting member shown in U.S. Pat. No. 4,507,557 and Japanese Patent Laid-Open No. 2004-272353.

Furthermore, Japanese Patent Laid-Open No. 2001-43021 discloses a configuration to control turning on a light emitting unit for each sensor unit. Specifically, in order to prevent light emitted from the light emitting unit of one sensor unit from being received by the light receiving unit of the other sensor unit as disturbance light, control is performed such that light is emitted in alternation from the light emitting units of the sensor units.

Furthermore, Japanese Patent No. 4118664 discloses a configuration in which retroreflecting members are disposed at the top and bottom sides of the coordinate input effective region, and sensor units are disposed spaced apart from each other between the retroreflecting members and the coordinate input effective region.

However, with the conventional techniques described above, it is difficult to support a multiple display as shown in FIG. 11A, in other words, an increase in size or horizontal length of the coordinate input effective region due to the following reasons. Note that FIG. 11A assumes displaying of a single image in a single large screen by using three front projectors.

First, in the case where a plurality of coordinate input apparatuses are lined up to support multiple display, as in conventional techniques (see FIG. 11B), a retroreflecting member 4 is indispensable in a joint portion of coordinate input apparatuses. As a result, in addition to a problem of discontinuities in the displayed image, it is impossible to continuously perform coordinate pointing and operation through a region "a" to a region b in FIG. 11B, which greatly deteriorates operability. Specifically, in the multiple display, retroreflecting members 4 in joint portions are hindering elements.

In order to solve this problem, as shown in FIG. 11A, it is necessary to provide the retroreflecting member 4 on the outside of the display region of the multiple display. As clearly seen from FIG. 11A, a difference in the distance between a direction "a" and a direction b in FIG. 11A increases with an increase in the number of display faces. Accordingly, in the coordinate input apparatus of this type in which light projected by the light projecting unit reaches the retroreflecting member 4, and light that has been reflected back by the retroreflecting member 4 is detected by the light receiving unit, a difference in the amount of received light increases with this difference in distance (light path difference).

That is, even if the amount of light projected by the sensor unit 1L is constant regardless of the light projection direction, a relatively large amount of light is received in the direction "a", and the smallest amount of light is received in the direction b due to the difference in distance. It is generally difficult to keep this difference within the dynamic range of a light receiving element (a photoelectric conversion element such as a CCD or a CMOS). Specifically, if settings are performed such that the amount of received light in the direction "a" corresponds to a maximum output value within the dynamic range, light in the direction b cannot be detected at all. Or, if light in an amount sufficient for detecting light in the direction b is projected, then the detection signal of light in the direction "a" saturates, which makes it difficult to obtain correct data.

In order to solve this problem, it is necessary to vary the amount of projected light according to the light projection direction by, for example, increasing the amount of light projected in direction b in FIG. 11A. In this manner, the amount of received light can be leveled, but at the same time, this inevitably causes a problem such as an increase in cost or size of the apparatus.

As a configuration for reducing the light path difference, as shown in FIG. 11C, a configuration is conceivable in which a larger number of sensor units 1L and 1R are disposed, and the display region is divided into the regions for detection by the respective sensor units. At this time, from the viewpoint of avoiding deterioration of operability described above, the retroreflecting members 4 are provided only at the top and bottom sides of the display region as shown in FIG. 11C, for example, such that no retroreflecting member 4 is present in the display region. Although the number of sensor units increases, the light path difference is reduced and thereby stable detection of optical signals becomes possible.

In the configuration disclosed in Japanese Patent No. 4118664, retroreflecting members are provided at opposite sides of the display region, and a light projecting unit and a light receiving unit are provided on the outside of the retroreflecting members. At this time, if projected light and received light have the same height from the coordinate input face (height in the normal line direction to the coordinate input face) as the retroreflecting members, the retroreflecting members block the light path. Thus, for the adopted configuration, projected light and received light have different heights from the coordinate input face (height in the normal line direction to the coordinate input face) from the height of the retroreflecting members. However, this causes a new problem as described below.

As shown in FIG. 12A, the configuration disclosed in Japanese Patent No. 4118664 includes sensor units 901 each including a light projecting unit and a light receiving unit between a retroreflecting member 903 and a coordinate input face 902. Light projected from the light projecting unit in a sensor unit 901 is reflected back by a retroreflecting member 903 provided at the side opposing that sensor unit 901, and received by the light receiving unit of the sensor unit 901. Accordingly, a hatched portion 908 corresponds to the light path. If a pointer 907 is disposed as shown in FIG. 12A, with respect to the sensor unit 901 on the left side, the light path (hatched portion 908) is not blocked. Thus the sensor unit 901 on the left side cannot detect the pointer 907. On the other hand, the light path (hatched portion 908) of the sensor unit 901 on the right side is blocked by the pointer 907, and thus the position information (direction) of the pointer 907 can be detected.

That is, in the state of the pointer 907, in which one of the sensor units can detect the position information (direction) and the other sensor unit cannot detect the position information (direction), it is impossible to calculate the pointed position of the pointer 907. It is when the pointer 907 approaches the coordinate input face 902 so that the pointer 907 sufficiently blocks the light path of the sensor unit 901 on the left side, in other words, it is when the pointer 907 has reached a position where the pointer 907 is about to touch the coordinate input face 902, that the pointed position can be detected. Accordingly, in the configuration disclosed in Japanese Patent No. 4118664, if the pointer 907 is separated from the coordinate input face 902, the position thereof cannot be detected stably. Hereinafter, the function that enables detection of the position of the pointer 907 even in a position separated from the coordinate input face is referred to as "proximity input".

As a configuration that copes with this problem (problem that proximity input is impossible depending on the region), as shown in FIG. 12B, a configuration is conceivable in which a retroreflecting member is provided between the light projecting unit and the light receiving unit of the sensor unit 901. The retroreflecting member 903 is provided between a light projecting unit 910 and a light receiving unit 909 of the sensor unit 901 on the left side, and thereby the light path in which light from the light projecting unit 910 reaches a retroreflecting member 903 opposing thereto and the light path in which light from the retroreflecting member 903 opposing the light receiving unit 909 reaches the same are set as illustrated in FIG. 12B. In the case where the pointer 907 is in the same position as in FIG. 12A, although the pointer does not block the light path that reaches the light receiving unit 909 from the opposed retroreflecting member 903, it blocks the light path in which light from the light projecting unit 910 reaches the retroreflecting member 903 opposing thereto, and thus it is possible to detect the pointer 907. That is, this realizes a configuration in which detection is possible with the right and left sensor units 901, and proximity input is possible.

FIG. 12C illustrates the cross section of the sensor unit 901. In order to efficiently detect retroreflective light with this configuration, a distance L between the light projecting unit 910 and the light receiving unit 909 is set to be small. However, setting the distance L to be small is equivalent to setting a width h of the retroreflecting member 903 to be small. When the width h of the retroreflecting member is reduced, the retroreflective light is also reduced substantially in proportion to the width h.

Therefore, it is necessary to solve a contradiction that the distance L needs to be small in order to efficiently detect retroreflective light, although the distance L needs to be large in order to secure sufficient retroreflective light.

SUMMARY OF THE INVENTION

The present invention provides a coordinate input apparatus that enables stable coordinates input regardless of the input position, a control method therefor and a program. Furthermore, the present invention provides a coordinate input apparatus that enables proximity input in the entire coordinate input effective region including the vicinities of sensor units, a control method therefor and a program.

In order to achieve the above-described goals, a coordinate input apparatus of the present invention is configured as described below. Specifically, a coordinate input apparatus includes: retroreflecting units provided at two opposite sides of a rectangular-shaped coordinate input effective region; and a plurality of sensor units provided at the two sides, wherein each of the sensor units includes: a light receiving unit adapted to receive light that reaches the light receiving unit; a light projecting unit adapted to project light toward a retroreflecting unit provided at one of the two sides, which opposes the light projecting unit; and a surface light emitting unit adapted to emit even diffused light from a band-shaped surface, and each of the sensor units simultaneously detects, by the light receiving unit, light that has been projected by the light projecting unit and reflected back by the retroreflecting unit provided at the side opposing the light projecting unit, and light that has been emitted by surface light emitting units of a plurality of sensor units provided at the side opposing the light projecting unit.

As described above, the present invention can provide a coordinate input apparatus that enables stable coordinate input regardless of the input position, and that enables proximity input in the entire coordinate input effective region including the vicinities of sensor units, a control method therefor and a program.

Further features of the present invention will become apparent from the following description of exemplary embodiments (with reference to the attached drawings).

BRIEF DESCRIPTION OF THE DRAWINGS

FIG. 2A illustrates a structure of a sensor unit 1 of Embodiment 1.

FIG. 2B illustrates a structure of the sensor unit 1 of Embodiment 1.

FIG. 2C illustrates a structure of the sensor unit 1 of Embodiment 1.

FIG. 2D illustrates a structure of the sensor unit 1 of Embodiment 1.

FIG. 3A illustrates optical characteristics of Embodiment 1.

FIG. 3B illustrates optical characteristics of Embodiment 1.

FIG. 3C illustrates optical characteristics of Embodiment 1.

FIG. 3D illustrates optical characteristics of Embodiment 1.

FIG. 3E illustrates optical characteristics of Embodiment 1.

FIG. 3F illustrates optical characteristics of Embodiment 1.

FIG. 6A illustrates position detection in a coordinate input effective region of Embodiment 1.

FIG. 6B illustrates position detection in a coordinate input effective region of Embodiment 1.

FIG. 6C illustrates position detection in a coordinate input effective region of Embodiment 1.

FIG. 6D illustrates position detection in a coordinate input effective region of Embodiment 1.

FIG. 6E illustrates position detection in a coordinate input effective region of Embodiment 1.

FIG. 7 is a flowchart illustrating coordinate calculation processing of Embodiment 1.

DESCRIPTION OF THE EMBODIMENTS

Exemplary embodiments of the present invention will be described in detail below with reference to attached drawings. It should be noted that the configurations of the embodiments described hereinafter are merely exemplary, and the present invention is not intended to be limited to the configurations described hereinafter.

<Embodiment 1>

Figure 1:
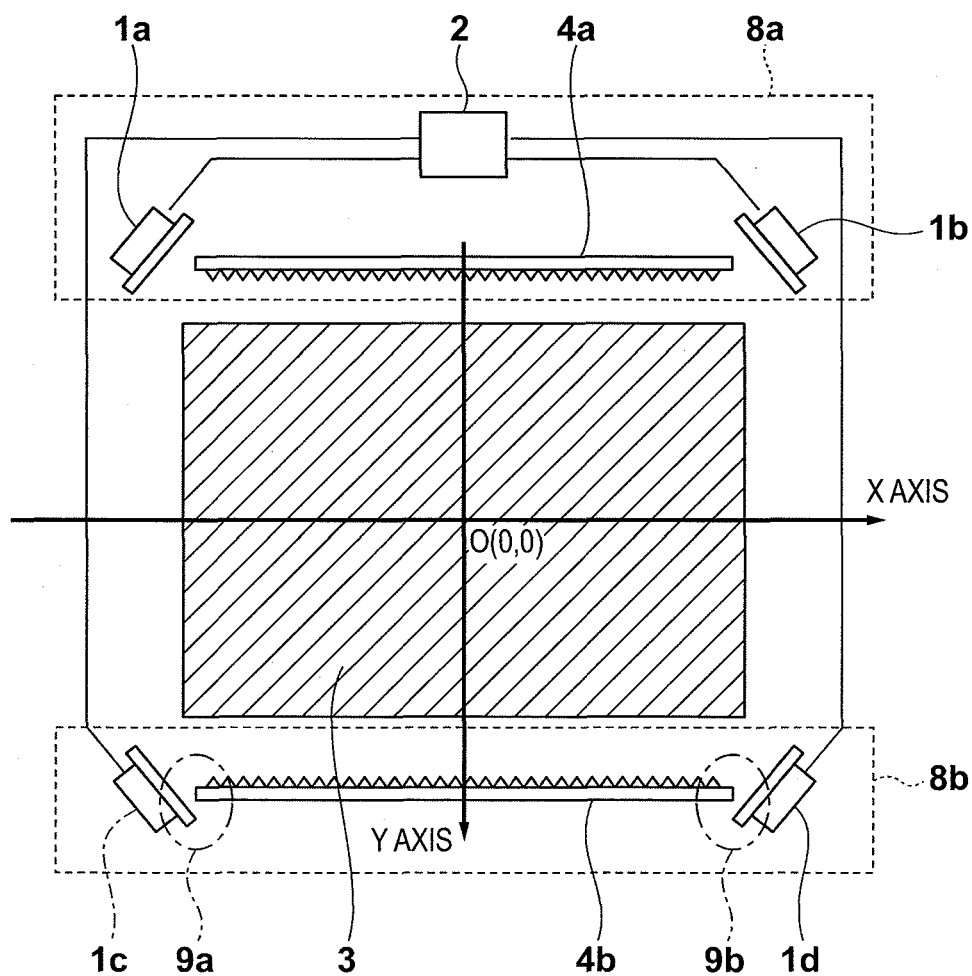
FIG. 1 is a schematic diagram of a coordinate input apparatus according to Embodiment 1.

FIG. 1 is a diagram for providing a general description of a coordinate input apparatus of Embodiment 1.

In FIG. 1, sensor units 1a to 1d are respectively disposed in the neighborhood of the four corners (in the neighborhood of corner portions) of a rectangular-shaped coordinate input effective region 3. Each of the sensor units 1a to 1d includes a light projecting unit, a light receiving unit and a surface light emitting unit (to be described below in details). Retroreflecting members 4a and 4b are respectively disposed at opposite sides of the coordinate input effective region 3, and each retroreflecting member reflects back light projected by the light projecting units of sensor units provided at one of the opposite sides opposing the retroreflecting member (the sensor units 1a and 1b or the sensor units 1c and 1d).

The light receiving units of the sensor units 1a to 1d detect retroreflective light that has been reflected back. Each light receiving unit is configured to detect this retroreflective light, and also detect light emitted by the surface light emitting units of the sensor units provided at the side opposing the light receiving unit (the sensor units 1a and 1b or the sensor units 1c and 1d) at the same time. That is, when the light receiving unit of the sensor unit 1a is taken as an example, light that is projected by the light projecting unit of the sensor unit 1a and reflected back by the retroreflecting member 4b, which is provided at the side opposing the sensor unit 1a, and returned to the light projecting unit, and light emitted by the surface light emitting units of the sensor units 1c and 1d are detected at the same time. Also, when viewed from the sensor unit 1a, regions 9a and 9b correspond to joint portions when light from the surface light emitting unit and retroreflective light are detected. In order to accurately detect light that travels in the directions of the joint portions, the surface light emitting units of the sensor units and the retroreflecting member 4 are configured to mutually overlap in the joint portions. Also when viewed from the sensor unit 1b, the joint portions in the regions 9a and 9b are set to overlap the retroreflecting member 4.

Also, each reference numeral 8a and 8b indicates a casing (hereinafter referred to as a "sensor bar") of the coordinate input apparatus, the sensor bar 8a accommodating the sensor units 1a and 1b and the retroreflecting member 4a, and the sensor bar 8b accommodating the sensor units 1c and 1d and the retroreflecting member 4b. Note that the sensor bar 8a further accommodates a control/arithmetic unit 2. Signals are sent and received between the sensor bars 8a and 8b through communication units by wire or wirelessly, and the control/arithmetic unit 2 controls the light projecting units, the light receiving units and the surface light emitting units of the sensor units 1a to 1d. Also, the control/arithmetic unit 2 calculates a pointed position based on information output from the sensor units 1a to 1d, and outputs the calculation results to an external apparatus (e.g., PC). Note that in the description given below, the sensor units 1a to 1d are collectively referred to as the "sensor unit(s) 1". Similarly, the retroreflecting members 4a and 4b are collectively referred to as the "retroreflecting member(s) 4".

Description of Sensor Units 1

FIGS. 2A to 2D illustrate structures of a sensor unit 1 of Embodiment 1.

FIG. 2A is a cross-sectional view of the sensor unit 1, and the optical system thereof will be mainly described. Reference numeral 5 indicates a rectangular-shaped coordinate input face 5 for performing coordinate input, and a light projecting unit 30, a light receiving unit 40 and a band-shaped surface light emitting unit 50 are provided in order from the side of the coordinate input face 5. The optical center line of the light projecting unit 30 is indicated by a line segment b-b, the optical center line of the light receiving unit 40 is indicated by a line segment c-c, and the optical center line of the surface light emitting unit 50 is indicated by a line segment d-d. As shown in FIG. 2A, the line segment b-b, which is the optical center line of the light projecting unit 30, is in a position separated by a distance L1 from the line segment c-c, which is the optical center line of the light receiving unit 40. The line segment d-d, which is the optical center line of the surface light emitting unit 50, is in a position separated by a distance L2 from the line segment c-c.

FIGS. 2B to 2D are front views of the sensor unit 1 (as viewed from the arrow direction e in FIG. 2A), and FIG. 2B illustrates the light projecting unit 30, FIG. 2C illustrates the light receiving unit 40 and FIG. 2D illustrates the surface light emitting unit 50.

In FIG. 2B, reference numeral 31 indicates an infrared LED that emits infrared light. The emitted light is projected by a projecting lens 32 in the range of approximately 90°. On the other hand, with respect to the direction that is parallel to the coordinate input face 5 (see FIG. 2A), the light from the infrared LED 31 is projected as a light flux that is restricted in the direction perpendicular to the above-described parallel direction, such that the light is projected mainly onto the retroreflecting member 4. Reference numeral 33 indicates a light-transmitting adhesive, with which a space between the projecting lens 32 and the infrared LED 31 is completely filled.

In FIG. 2C, reference numeral 41 indicates a one-dimensional line CCD, reference numeral 42 indicates a light-receiving lens that acts as a light collecting optical system, reference numeral 43 indicates a diaphragm that restricts the incident direction of light, and reference numeral 44 indicates an infrared filter that prevents entering of extraneous light such as visible light. The light projected by the light projecting unit 30 is reflected back by the retroreflecting member 4, is passed through the infrared filter 44 and the diaphragm 43, and then is collected on the detection face of the line CCD 41 by the light-receiving lens 42.

In the case of Embodiment 1, the light projecting unit 30 and the light receiving unit 40 are disposed so as to mutually overlap. The distance therebetween, L1, is set to a value that is sufficiently small compared with the distance from the light projecting unit 30 to the retroreflecting member 4 opposing thereto such that the observation angle with respect to the retroreflecting member 4 is small. Accordingly, a configuration is realized in which sufficient retroreflective light can be detected by the light receiving unit 40 even if there is the distance L1.

Also, when viewed from the front, the center of the diaphragm 43 and the center of emission by the light projecting unit 30 are set in the same position. Therefore, the light projected by the light projecting unit 30 in the range of approximately 90° is reflected back by the retroreflecting member 4 opposing thereto, is passed through the infrared filter 44 and the diaphragm 43, and forms an image by the light-receiving lens 42 on the pixels of the line CCD 41 according to the light incident angle. Accordingly, an output signal from the line CCD 41 represents the light amount distribution according to the incident angle of the reflected light, and thus the pixel number of the line CCD 41 represents angle information.

FIG. 2D schematically illustrates the surface light emitting unit 50, and reference numerals 51, 52 and 53 indicate infrared LEDs, reference numerals 54, 55 and 56 indicate collimator lenses, reference numerals 57, 58 and 59 indicate a light-transmitting adhesive for bonding the infrared LED and the collimator lens. Reference numeral 60 indicates a diffuser plate that diffuses light emitted by the infrared LEDs 51, 52 and 53, and thereby emits diffused light from the diffuser plate 60.

Although three infrared LEDs 51, 52 and 53 are used in Embodiment 1, the number of the infrared LEDs is not limited to this. The number of the infrared LEDs is appropriately set according to the length of the diffuser plate 60 such that light is evenly emitted from the diffusing surface.

Figure 5A:
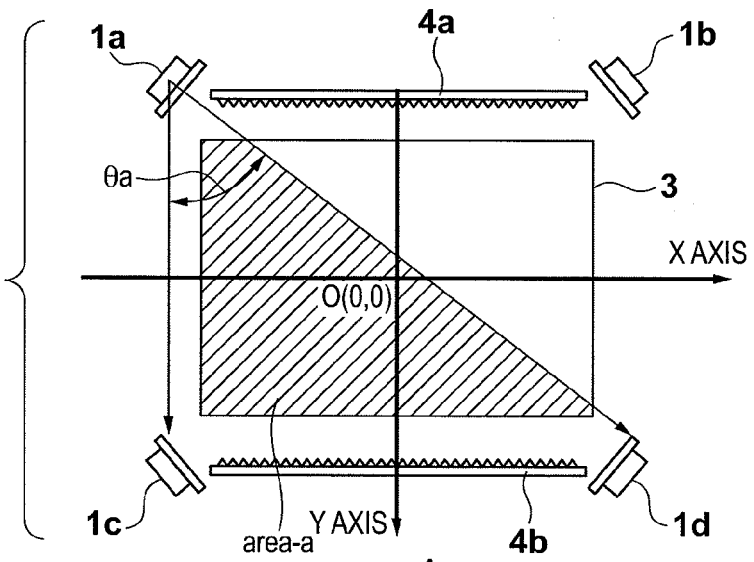
FIG. 5A illustrates a region in which a pointed position can be detected by a sensor unit of Embodiment 1.

Also, the present invention is not limited to the configuration described above as long as diffused light is evenly irradiated from the light emitting surface. For example, a configuration that uses a light-guiding plate may be adopted. "Evenly" used herein will be described below in further detail. As shown in FIG. 5A, the range of the field of view of the light receiving unit 40 of the sensor unit 1a is an angle θa, which will be described in detail below. Therefore, in the range of the field of view ea, the light receiving unit 40 detects light from the retroreflecting member 4 and the surface light emitting units 50 provided at the side opposing the light receiving unit 40. Therefore, in FIG. 2D, it is necessary that the light receiving units 40 of the sensor units 1 provided evenly at the side opposing the surface light emitting unit 50 detect such light in the range of a length L3 of the light emitting surface of the surface light emitting unit 50.

It is assumed that the surface light emitting unit 50 in FIG. 2D is provided in the sensor unit 1a in FIG. 1 (FIGS. 3A to 3F). At a point S, the directions of the light receiving units 40 of the sensor units 1c and 1d provided at the side opposing the sensor unit 1a are assumed to be M and N, respectively. Of the diffused light emitted at the point S, the light receiving unit of the sensor unit 1c detects only the light in the direction M and the light receiving unit of the sensor unit 1d detects only the light in the direction N. Accordingly, diffused light emitted in other directions is consumed as waste energy in the coordinate input apparatus. By using the surface light emitting unit 50 that emits diffused light in this manner, it is possible to generate necessary light in the range of the length L3 of the light emitting surface at a low cost without using a complex optical system, although there is light energy loss.

As described above, the surface light emitting unit 50 is required to continuously irradiate light in the range of the length L3 of its light emitting surface onto the light receiving units 40 of at least two sensor units 1 provided at the side opposing the surface light emitting unit 50. Therefore, light intensity with which each of the light receiving units 40 of the sensor units 1a to 1d can, in the range of the field of view of the light receiving unit, continuously detect light in the range of the length L3 of the light emitting surface of the surface light emitting unit 50 will be hereinafter referred to as "substantially even diffused light" irradiated by the surface light emitting unit 50.

Also, in the present invention, for example, the optical system of the light projecting unit 30 is used as a component of the surface light emitting unit 50, thereby achieving a cost reduction effect due to sharing of component.

As described above, the light receiving unit 40 is disposed between the light projecting unit 30 and the surface light emitting unit 50. Then, the distance L1 between the light projecting unit 30 and the light receiving unit 40 is set to a value that is sufficiently small compared to the distance from the light projecting unit 30 to the retroreflecting member 4 provided at the side opposing thereto, such that the observation angle with respect to the opposed retroreflecting member 4 is small. Similarly, the distance L2 between the surface light emitting unit 50 and the light receiving unit 40 is also set to a sufficiently small value. Accordingly, by adopting a configuration in which the light receiving unit 40 is held between the light projecting unit 30 and the surface light emitting unit 50, the light receiving unit 40 can efficiently detect both retroreflective light of light projected by the light projecting unit 30, and light emitted by the surface light emitting units 50 provided at the side opposing the light receiving unit 40.

Here, a signal detected by the receiving unit 40 of the sensor unit 1 will be examined. A description will be given focusing on the sensor unit 1a in FIG. 1. The intensity of retroreflective light detected by the light receiving unit 40, the retroreflective light having been projected by the light projecting unit 30 and reflected back by the retroreflecting member 4b, is determined mainly by the following factors.

Factor 1: distribution of light projected by the light projecting unit 30

Factor 2: incident angle characteristics of retroreflection efficiency of light that is incident on the retroreflecting member 4b Factor 3: distance between the light projecting unit 30 and the retroreflecting member 4b Factor 4: distribution of light received by the light receiving unit 40

These factors are described in order. In FIG. 2B, when the principal light beam direction of the light projecting unit 30 is f, generally, light radiant intensity in the direction f is strong, and the further the direction deviates toward a direction g or a direction h, the lower the light radiant intensity, as shown in FIG. 3B.

Also, in FIG. 3A, when the angle formed by the incoming direction of light and the normal line direction to the retroreflecting member 4b is defined as an incident angle α, the retroreflection efficiency of the retroreflecting member 4 is the highest at the incident angle 0° as shown in FIG. 3C, and decreases with an increase in the incident angle. Accordingly, an excellent retroreflection efficiency is obtained in a direction J in FIG. 3A, and the retroreflection efficiency deteriorates toward a direction K. That is, the intensity of the retroreflective light of light that has been projected by the projecting unit 30 and reached the retroreflecting member 4b is determined depending on the incident angle of the projected light.

Also, in FIG. 3A, the distance between the light projecting unit 30 of the sensor unit 1a and the retroreflecting member 4b differs depending on the direction. Specifically, the distance is relatively short in the direction J, and the distance increases toward the direction K. It is known that waves attenuate in an exponential manner with an increase in the distance that the waves travel. Furthermore, as shown in FIG. 2A, although light projected by the light projecting unit 30 is collimated, it is difficult to make the light into complete parallel light (difficult to realize an ideal point light source). Accordingly, with an increase in the distance to the retroreflecting member 4b, the light is spread over a greater area so that loss in light energy increases. Also in a light receiving optical system, generally, although light from the direction of the center of optical axis can be efficiently collected, light collecting efficiency decreases with an increase in the distance from the direction of the center of optical axis due to characteristics of the lens optical system.

In FIG. 3A, the intensity of retroreflective light detected in directions between the direction J and the direction K is mainly determined based on a combination of the above-listed factors 1 to 4. The incident angle α is the largest and the distance to the retroreflecting member 4 is the longest in the direction K, and thus due to the factors 2 and 3, the retroreflective light that can be detected by the light receiving unit 40 is the smallest in the direction K. Accordingly, by setting the direction of the principal light beam from the light projecting unit 30, in which the radiant intensity of the light projecting unit 30 is the largest, to the direction K, or by setting the direction of the center of optical axis of the light receiving optical system to the direction K, a larger amount of retroreflective light can be detected. FIG. 3D illustrates received light distribution that is output by the light receiving unit 40 at this time. In the direction K, although the light radiant intensity of the light projecting unit 30 is strong, the output value is small due to the factors 2 and 3. Furthermore, in the direction J, although an effect of the factors 2 and 3 is small, since the radiant intensity of the light projecting unit 30 is weak, or a light collecting effect of the light receiving unit 40 decreases, the output value is small in the direction J as well. Therefore, a point that has the largest output value is generated in a direction R between the direction J and the direction K.

"β" shown in FIG. 3D indicates the dynamic range of the light receiving unit 40. For example, when the current applied to the infrared LED 31 of the light projecting unit 30 is increased in order to increase the level of output signals in the directions J and K, the output in the direction R also increases and the output in the vicinity of the direction R goes beyond the dynamic range, and the waveform is distorted. As a result, correct positional detection becomes impossible. Also, when a sufficient level of output signal is not obtained in the directions J and K, stable positional detection is again impossible due to an influence of noise. In directions outside of the directions J and K (a direction M and a direction N in FIG. 3A), output signals are further sharply attenuated, and in such a state, an effect of noise is serious.

In the coordinate input apparatus of the present invention, although a detailed description will be given below, with respect to the coordinate input effective region 3, the sensor unit 1a is required to include, in its detection range, the direction M in which the end of the coordinate input effective region 3 is included in the field of view, and the direction N in which an origin O of the coordinate input effective region 3 is included in the field of view. Accordingly, it is necessary to obtain stable signals through the entire detection range. Thus, each of the sensor units 1a to 1d includes the light projecting unit 30 and the surface light emitting unit 50 that project light toward the retroreflecting member 4 provided at the side opposing the sensor unit. Then, the control/arithmetic unit 2 causes the light projecting unit 30 of the sensor unit 1a and the surface light emitting units 50 of the sensor units 1c and 1d opposing the sensor unit 1a to emit light at the same time, and the light from these units 1c detected by the light receiving unit 40 of the sensor unit 1a.

Light emitted by the surface light emitting units 50 is diffused light as schematically shown in FIG. 2D. Therefore, the light receiving unit 40 of the sensor unit 1a detects only light emitted by the surface light emitting units 50 in the direction of the sensor unit 1a opposing the surface light emitting units 50, and light emitted in other directions is treated as extraneous light and is not detected. Therefore, light that has been emitted by the surface light emitting unit 50 and detected by the light receiving unit 40 indicates the incoming direction of the light, namely, angle information.

The waveform of a signal detected by the light receiving unit 40 of the sensor unit 1a, which is obtained by employing the above-described configuration, is as shown in FIG. 3E, and it is possible to detect stable signals within the dynamic range of the light receiving unit 40, through the range from the direction M to the direction N.

Although using the surface light emitting unit 50 generates extraneous light other than necessary light (light directed to the opposed sensor unit 1), the following advantages can be obtained as well. Although retroreflective light projected by the light projecting unit 30 travels back and forth, that is, travels from the light projecting unit 30 to the retroreflecting member 4 opposing thereto and then from the opposing retroreflecting member 4 to the light receiving unit 40, light from the surface light emitting unit 50 travels one way and thus has little light loss. Also, as shown in FIG. 3A, when viewed from the sensor unit 1a, the distance to the surface light emitting unit 50 of the sensor unit is shorter than that to the surface light emitting unit 50 of the sensor unit 1d. Also, as shown in FIG. 3A, the normal line to the surface light emitting unit 50 of the sensor unit 1d is directed to the sensor unit 1a, and the surface light emitting unit 50 of the sensor unit 1c has a large angular difference with respect to the normal line direction to the surface light emitting unit 50 of the sensor unit 1d. Generally, the surface light emitting unit 50 shown in FIG. 2D irradiates diffused light from the light emitting surface. The intensity of light emitted in the normal line direction to the light emitting surface is strong, and the larger the angular difference from the normal line direction, the weaker the intensity.

Thus, energy of light that travels from the surface light emitting unit 50 of the sensor unit 1c toward the sensor unit 1a is not so strong, but since the distance to the sensor unit 1a is short, the light receiving unit 40 of the sensor unit 1a can detect the light. In contrast, the distance between the sensor unit 1d and the sensor unit 1a is long, but since the energy of light that travels toward the sensor unit 1a is strong, the light receiving unit 40 of the sensor unit 1a can detect the light.

When viewed from the sensor unit 1b, the normal line direction to the light emitting surface of the sensor unit 1c corresponds to the direction of the sensor unit 1b, and the distance therebetween is long. Therefore, as in the case of the sensor unit 1a, stable signals can be obtained.

That is, by substantially matching the normal line direction to the light emitting surface of the sensor unit 1d (first sensor unit) to the direction of the sensor unit 1a provided at the side opposing the sensor unit 1d (second sensor unit), it becomes possible for the sensor unit 1a and the sensor unit 1b to detect the light from the sensor unit 1d at the same time. Specifically, the principal light beam direction (optical axis direction) of the light projecting unit 30 of the sensor unit 1a is the direction K, and this direction K is caused to substantially match the normal line direction to the light emitting surface of the surface light emitting unit 50 of the sensor unit 1d, which is disposed in the diagonal position of the sensor unit 1a and provided at the side opposing thereto.

With the configuration described above, it is not necessary to perform driving control of the surface light emitting unit 50 of the sensor unit 1d (for example, value of current applied to the infrared LED, or light emission time) for each of the case where detection is performed with the sensor unit 1a and the case where detection is performed with the sensor unit 1b. As a result, detection can be performed with the sensor units 1a and 1b at the same time, and thus sampling rate in coordinate calculation can be improved (sampling rate can be doubled compared with the case in which detection is performed separately by the sensor units 1a, 1b, 1c and 1d).

Figure 8A:
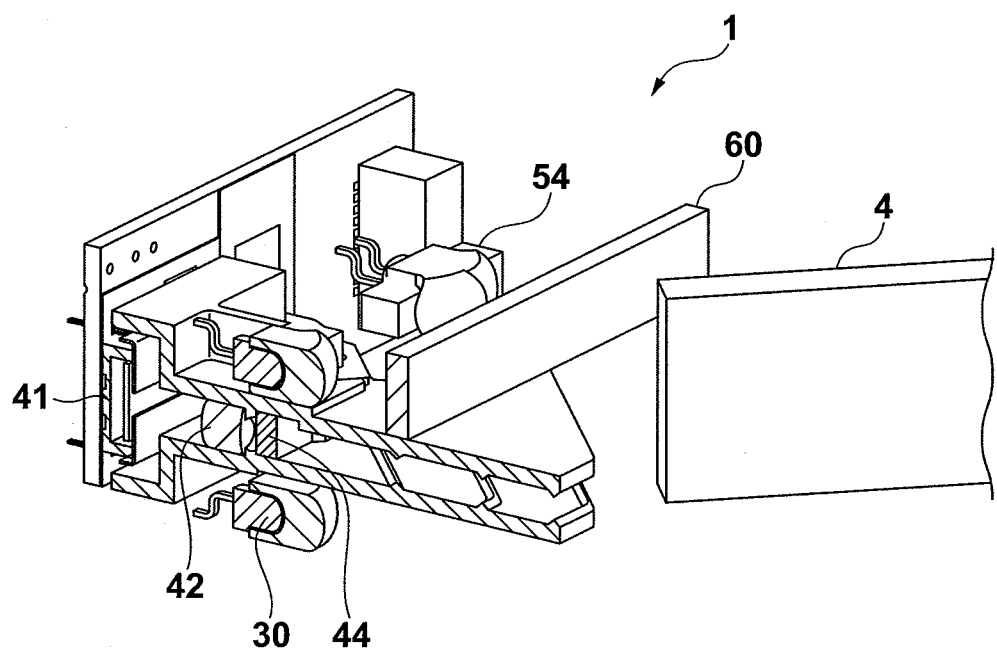
FIG. 8A illustrates the height relation between a sensor unit and a retroreflecting member of Embodiment 1.

FIG. 8A shows the cross section of the sensor unit 1 in FIG. 2A, and also illustrates the height relation (the height direction corresponds to the normal line direction to the coordinate input face 5) between the sensor unit 1 and the retroreflecting member 4.

Figure 8B:
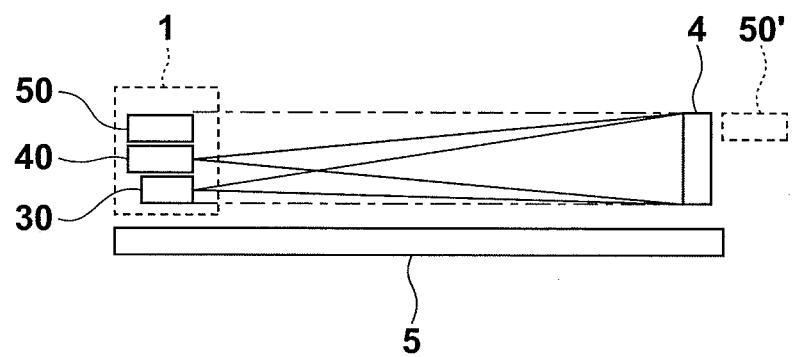
FIG. 8B illustrates the height relation between a sensor unit and a retroreflecting member of Embodiment 1.

The light receiving unit 40 (configured by the line CCD 41, the light-receiving lens 42, the infrared filter 44 and the like) is disposed between the light projecting unit 30 and the surface light emitting unit 50 (configured by a collimator lens 54, the diffuser plate 60 and the like). In the present invention, the upper end portion of the retroreflecting member 4 is substantially at the same height as the upper end portion of the diffuser plate 60 of the surface light emitting unit 50, and the lower end of the retroreflecting member 4 is substantially at the same height as the lower end of the light projecting unit 30. FIG. 8B shows the above-described state, showing the height relation between the sensor unit 1 and the retroreflecting member 4 provided at the side opposing the sensor unit 1. Note that the heights of the retroreflecting members 4 provided at two sides are the same, but the retroreflecting member 4 on the side of the sensor unit 1 is not shown in FIG. 8B.

FIG. 8B illustrates a light beam that travels from the light projecting unit 30 to the retroreflecting member 4 provided at the side opposing the light projecting unit 30, and a light beam that reaches to the light receiving unit 40 from the retroreflecting member 4. If one of these light beams is blocked, the sensor unit 1 can detect the direction in which the light beam is blocked, and thus even if the pointer does not contact the coordinate input face 5, the sensor unit 1 can perform the detection. In other words, proximity input is possible.

Also, the sensor unit 1 in FIG. 8B receives light from a surface light emitting unit 50' of a sensor unit 1 provided at the side opposing the sensor unit 1. Since the upper end portion of the diffuser plate 60 in the surface light emitting unit 50' and the upper end portion of the retroreflecting member 4 are disposed at the same height, the height in which proximity input is possible is kept to be constant in a joint portion between the retroreflecting member 4 and the diffuser plate 60. Accordingly, it is possible to provide a coordinate input apparatus having excellent operability for the users.

Description of Control/Arithmetic Unit

CCD control signals for CCD ("CCD control signals"), clock signals for CCD ("CCD clock signals"), output signals from CCD ("CCD output signals") and LED drive signals are sent and received between the control/arithmetic unit 2 and the sensor units 1a to 1d shown in FIG. 1.

Figure 4A:
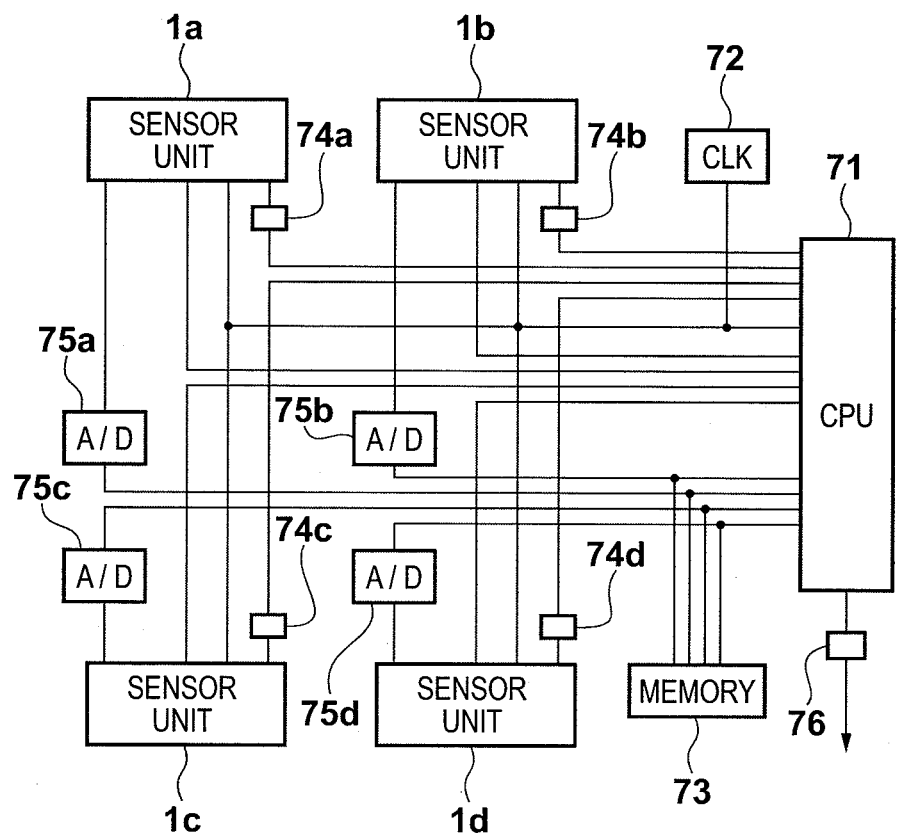
FIG. 4A is a block diagram of a control/arithmetic unit of Embodiment 1.

FIG. 4A is a block diagram of the control/arithmetic unit 2. A CCD control signal is output from an arithmetic control circuit (CPU) 71 configured by a one-chip microcomputer or the like, and the arithmetic control circuit (CPU) 71 controls shutter timing, data output or the like of the CCD. A CCD clock signal is sent from a clock generation circuit (CLK) 72 to the sensor units 1a to 1d, and is also input to the arithmetic control circuit 71 in order to perform various types of control in synchronization with the line CCD 41.

A LED drive signal is supplied to the infrared LEDs of the light projecting units 30 or the surface light emitting units 50 of the sensor units 1a to 1d from the arithmetic control circuit 71, via LED drive circuits 74a to 74d. Also, the LED drive circuits 74a to 74d control power supply to the light projecting units 30 or the surface light emitting units 50 of the sensor units 1a to 1d, according to the timing described below.

Detection signals (analog signals) from the line CCDs 41 that serve as light receiving units 40 of the sensor units 1a to 1d are respectively input to AD converters 75a to 75d of the control/arithmetic unit 2, and converted to digital signals under the control by the arithmetic control circuit 71. The converted digital signals are stored in a memory 73 as necessary, the angle and also coordinate values are calculated in the method described below, and the results thereof are output to a terminal of an external PC or the like, via a communication interface (for example, USB interface) 76.

Figure 4B:
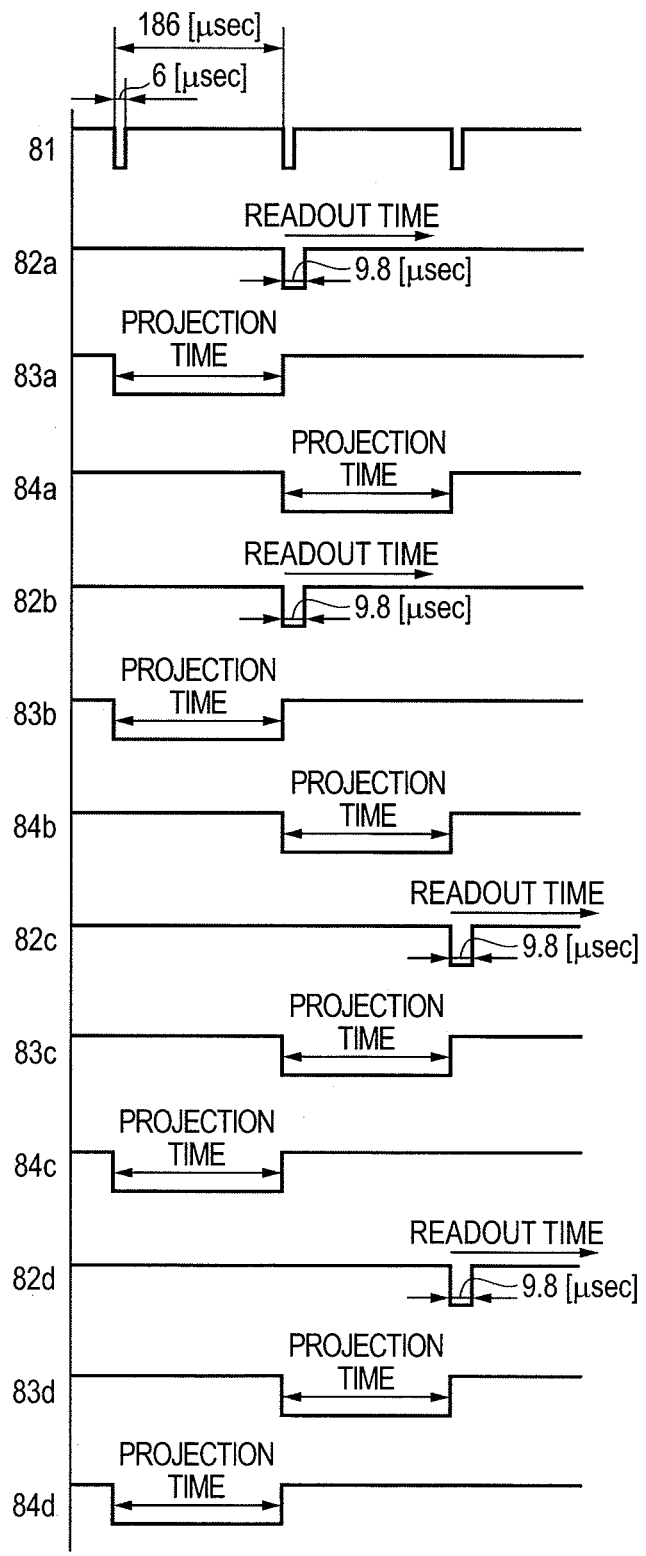
FIG. 4B is a timing chart of the control/arithmetic unit of Embodiment 1.

FIG. 4B is a timing chart for various signals.

Reference numerals 81 and 82 indicate CCD control signals. At the interval determined by the control signal 81, the shutter releasing time of the line CCDs 41 is determined. Reference numerals 82a, 82b, 82c and 82d indicate gate signals to the sensor unit 1a, 1b, 1c and 1d, respectively, which are signals for transferring electric charges in photoelectric conversion units in the line CCDs 41 to a reading out unit. Reference numerals 83a, 83b, 83c and 83d indicate signals for driving the infrared LEDs 31 of the light projecting units 30 of the sensor units 1a, 1b, 1c and 1d, respectively. Also, reference numerals 84a, 84b, 84c and 84d indicate signals for driving the infrared LEDs 51 to 53 of the surface light emitting units 50 of the sensor units 1a, 1b, 1c and 1d, respectively.

First, in the first cycle of the control signal 81, the infrared LEDs 31 of the light projecting units 30 of the sensor units 1a and 1b, which are provided at one side of the coordinate input effective region 3, are turned on, and at the same time, the infrared LEDs 51 to 53 of the surface light emitting units 50 of the sensor units 1c and 1d, which are provided at the side opposing the one side, are turned on. Accordingly, the light receiving unit 40 of the sensor unit 1a detects both light that has been projected by the light projecting unit 30 and reflected back by the retroreflecting member 4b provided at the opposite side, and light from the surface light emitting units 50 of the sensor units 1c and 1d, which are provided at the opposite side. Similarly, the light receiving unit 40 of the sensor unit 1b detects retroreflective light of light projected by the light projecting unit 30 of the sensor unit 1b and light from the surface light emitting units 50 of the sensor units 1c and 1d. Then, in response to gate signals 82a and 82b, detection results of the light receiving units 40 of the sensor units 1a and 1b are output.

For example, in the case where input by a pointer such as a finger has not been made, in other words, there is no light-blocked portion, as output from the sensor units 1a to 1d, the light amount distribution as shown in FIG. 3E is obtained from the read signal. Of course, such light amount distribution is not obtained in all systems, and it varies according to the properties of the retroreflecting member 4, the light projecting unit 30 or the surface light emitting unit 50, or due to changes over time (a stain in the reflection surface or the like).

Next, based on the following control signal 81, the light projecting units 30 of the sensor units 1c and 1d (signals 83c and 83d) and the infrared LEDs of the surface light emitting units 50 (signal 84a and 84b) of the sensor units 1a and 1b are driven. Then, in response to gate signals 82c and 82d, detection results of the light receiving units 40 of the sensor units 1c and 1d are output.

Although the light projecting units 30 of the sensor units 1a and 1b emit light simultaneously, a configuration is adopted such that light from the light projecting unit 30 of the sensor unit 1a is not detected by the light receiving unit 40 of the sensor unit 1b. Such a configuration may be achieved by limiting the light projection range of the light projecting unit 30 or providing a light shielding plate between the sensor units 1a and 1b, for example. Accordingly, as shown in FIG. 4B, it is possible to detect necessary signals in at least three cycles of the control signal 81. Furthermore, when the sensor units 1a and 1b are caused to project light during a read-out period for the sensor units 1c and 1d, it is possible to detect necessary signals in two cycles of the control signal 81.

By performing control as described above, an excellent effect can be obtained that a high-speed position detection sampling rate is achieved.

In FIG. 3E, level A represents the level of the largest amount of detection light and level B represents the level of the smallest amount of detection light. A level around the level B is obtained in the state where there is no detection light, and with an increase in the amount of detection light, the level approaches to the level A. In this manner, analog signals output from the light receiving units 40 are sequentially subjected to AD conversion, and input to the arithmetic control circuit 71 as digital signals.

FIG. 3F is an example of output obtained in the case where input is performed using a pointer such as a finger, in other words, the case where detection light is blocked. The portion of level C corresponds to a portion where reflected light is blocked by the pointer, and thus the amount of light is low only in that portion.

Detection is performed by detecting change in the light amount distribution. Specifically, first of all, the initial state in which there is no input as shown in FIG. 3E (hereinafter, data obtained in the initial state is referred to as "initial data (or reference data)") is stored in advance in the memory 73. Then, it is determined whether there is a change as shown in FIG. 3F by calculating a difference between pixel data obtained in each sample period and the pre-stored initial data.

Specifically, a threshold Vtha as indicated in FIG. 3F is compared with an output signal, such that the pixel numbers having a value less than or equal to the threshold Vtha are detected. Then, the range of the pixels whose output levels are less than or equal to the threshold Vtha is calculated, and the center of the range, for example, is defined as the direction in which an object that is blocking light exists. Note that the pixel number N of the line CCD 41 indicates the incoming direction (angle θ) of light, as clearly understood based on the optical system shown in FIG. 2C. Accordingly, by calculating the relation between the pixel number N and the angle θ in advance as a function when the apparatus is assembled in a factory, an output pixel number N can be converted to an angle θ.

Description of Coordinate Calculation Method

Figure 5B:
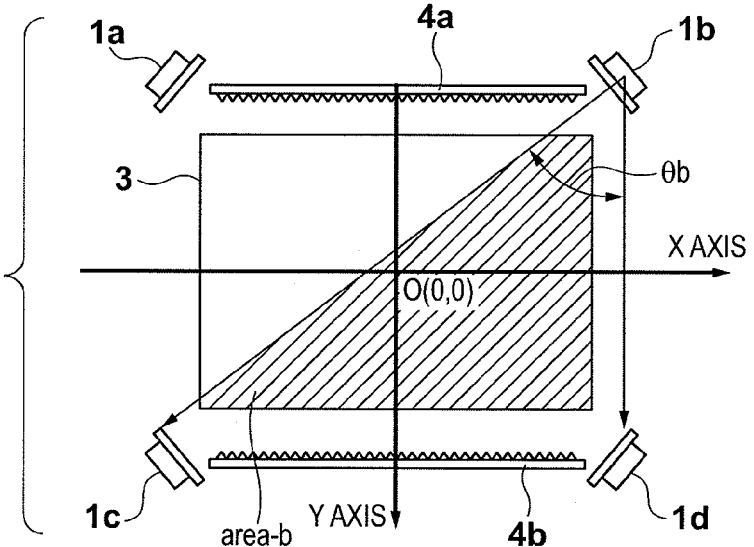
FIG. 5B illustrates a region in which a pointed position can be detected by a sensor unit of Embodiment 1.
Figure 5C:
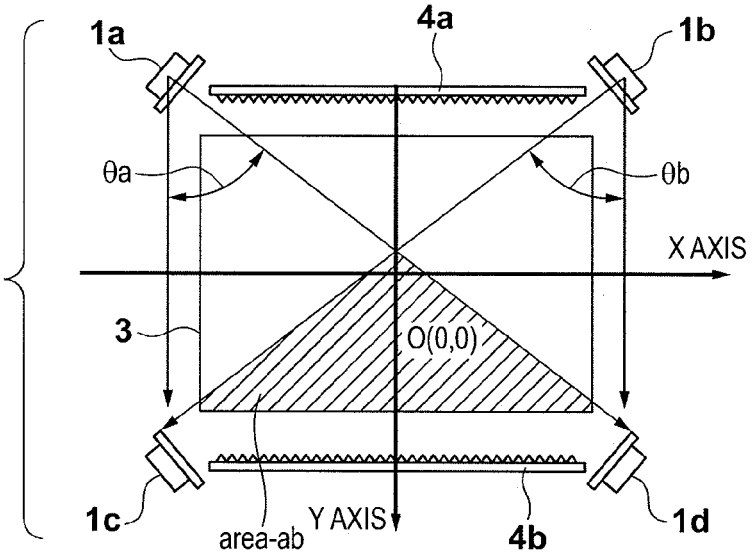
FIG. 5C illustrates a region in which a pointed position can be detected by a sensor unit of Embodiment 1.

FIGS. 5A to 5C are diagrams each illustrating a range of the field of view of the sensor units 1. FIG. 5A illustrates the range of the field of view of the sensor unit 1a. Light from the light projecting unit 30 of the sensor unit 1a is reflected back by the retroreflecting member 4b provided at the side opposing the sensor unit 1a, and detected by the light receiving unit 40 of the sensor unit 1a. At the same time, the light receiving unit 40 of the sensor unit 1a also detects light from the surface light emitting units 50 of the sensor units 1c and 1d provided at the opposite side. Accordingly, the range of the incoming direction of light detected by the light receiving unit 40 of the sensor unit 1a is indicated by an angle θa. Accordingly, when an input pointing operation is performed using a pointer in the range of a hatched portion area-a in the coordinate input effective region 3, the light in the direction of the pointing is blocked, such that the sensor unit 1a can detect the direction (angle) of the pointing based on the change in the light. However, if an input pointing operation is performed in a position outside the hatched portion area-a in the coordinate input effective region 3, the sensor unit 1a cannot detect the operation.

FIG. 5B illustrates the range of the field of view of the sensor unit 1b. In this case, the range of the field of view of the sensor unit 1b is indicated by an angle θb. Accordingly, when an input pointing operation is performed using a pointer in the range of a hatched portion area-b in the coordinate input effective region 3, the light in the direction of the pointing is blocked, such that the sensor unit 1b can detect the direction (angle) of the pointing.

A hatched portion area-ab in FIG. 5C is an overlap region (a region where the hatched portions in FIG. 5A and FIG. 5B overlap) of the range of the field of views of the light receiving units of the light receiving units 40 of the sensor units 1a and 1b. Accordingly, when a pointing operation is performed using a pointer in the region of this hatched portion area-ab, the direction of the pointing can be detected by both the sensor units 1a and 1b. Accordingly, it becomes possible to geometrically calculate the pointed position using the distance between the sensor units 1a and 1b and the directions (angles) obtained by the sensor units 1a to 1d.

As shown in FIG. 1, the sensor units 1c and 1d are respectively disposed in positions that are substantially symmetric to the positions of the sensor units 1a and 1b with respect to the X axis. Similarly, the sensor units 1b and 1d are respectively disposed in positions that are substantially symmetric to the positions of the sensor units 1a and 1c with respect to the Y axis. Accordingly, a position pointed in the range of a hatched portion area-cd in the coordinate input effective region 3 in FIG. 6A can be calculated based on angle information obtained by the sensor units 1c and 1d. Similarly, a pointed position in a hatched portion area-ac shown in FIG. 6B can be calculated using angle information obtained by the sensor units 1a and 1c. Also, a pointed position in a hatched portion area-bd shown in FIG. 6C can be calculated using angle information obtained by the sensor units 1b and 1d.

Also, a pointed position in the hatched portion area-acd shown in FIG. 6D can be calculated using either detection results of the sensor units 1c and 1d or detection results of the sensor units 1a and 1c. Accordingly, accuracy in position calculation is improved by using an average value of all the output detection results.

Furthermore, when coordinates are input continuously from the hatched portion area-ac (FIG. 6B) to the hatched portion area-cd (FIG. 6A), the combination of sensor units 1 used for position calculation changes during the input operation. When such a change has occurred, due to deviation in the position or measurement error of the sensor unit, for example, detected coordinate values may result in discontinuous values even though a continuous coordinate input operation has been performed. In other words, due to a change in the combination of the sensor units, coordinate calculation resolution deteriorates.

In order to prevent such deterioration, at a point α in FIG. 6D, results output from the sensor units 1a and 1c are used, and as the point approaches a point β, a degree in which results output from the sensor units 1c and 1d are taken into account is increased. Then, at the point β, only results output from the sensor units 1c and 1d are used. In this manner, the weight applied to the results output from the sensor units 1a and 1c and that applied to the results output from the sensor units 1c and 1d are changed (weighted average) according to the position, thereby achieving an excellent effect that faithful detection of pointed position becomes possible.

In addition, in an hatched portion area-abcd shown in FIG. 6E, position calculation is possible using any combination of sensor units 1. Accordingly, it is possible to correct the coordinate system such that output results obtained using the respective combinations of sensor units 1 when the origin O is pointed are the same.

As described above, in the coordinate input apparatus of the present invention, each of the sensor units 1a to 1d covers, in the effective range of the field of view thereof, the origin O and the entire side that is on the opposite side of the sensor unit in the coordinate input effective region 3. In the region where any of the sensor units 1a to 1d is switched to another, the field of views are set such that the position can be detected using a plurality of combinations of the sensor units 1a to 1d.

Description of Coordinate Calculation Processing

FIG. 7 is a flowchart illustrating coordinate calculation processing of Embodiment 1.

First, when the coordinate input apparatus is turned on, in step S102, various types of initialization for the coordinate input apparatus including port setting, timer setting and the like of the control/arithmetic unit 2 are performed. In step S103, the effective pixel ranges of the line CCDs 41 are set based on, for example, setting values stored in advance in the memory 73. Also, the number of times an initial reading operation for the line CCDs 41 is to be performed is set.

Note that this initial reading operation refers to an operation for removing unnecessary electric charge in the line CCDs 41, which is performed only when the coordinate input apparatus is started up. Unnecessary electric charge may be accumulated in the line CCDs 41 while it is not operated. If a coordinate input operation is executed in a state in which such unnecessary electric charge is accumulated, detection may become impossible or erroneous detection may occur. Therefore, in order to avoid these, in step S104, the reading operation is performed a predetermined number of times in a state in which projection of light by the light projecting units 30 and the surface light emitting units 50 is stopped. Unnecessary electric charge is removed in this manner.

In step S105, it is determined whether reading has been executed a predetermined number of times or more. If reading has not been executed a predetermined number of times or more ("NO" in step S105), the procedure returns to step S104. In contrast, if reading has been executed a predetermined number of times or more ("YES" in step S105), the procedure proceeds to step S106.

In step S106, pixel data of the line CCDs 41 in the state in which there is no light from the light projecting units 30 and the surface light emitting units 50 is obtained as base data. In step S107, the base data is stored in the memory 73. Next, in step S108, pixel data corresponding to an initial light amount distribution of a line CCD 41, which is obtained in a state in which there is light from the light projecting unit 30 and the surface light emitting units 50, is obtained as reference data. In step S109, the reference data is stored in the memory 73.

Note that in the expression "reference data obtained in the state in which there is light", light refers to light from the light projecting unit 30 of a sensor unit 1 and light from the surface light emitting units 50 of two sensor units 1 provided at the side opposing that sensor unit 1. Also, light is emitted at different timings between a pair of the sensor units 1a and 1b provided at the upper side of the coordinate input effective region 3 and a pair of the sensor units 1c and 1d provided at the lower side, and reference data is obtained. Since the sensor units 1a and 1b provided at the upper side and the sensor units 1c and 1d provided at the lower side are opposed to each other, if both pairs emit light simultaneously, each pair of sensor units detects, by the light receiving units 40 of the pair, light emitted by the other pair of sensor units. For avoiding this, light emission is performed at different timings as described above.

Then, in step S110, it is determined whether reference data has been obtained in all the sensor units 1a to 1d. If reference data has not been obtained in all the sensor units 1a to 1d ("NO" in step S110), processing in steps S108 and S109 is repeated. In contrast, if reference data has been obtained in all the sensor units 1a to 1d ("YES" in step S110), the procedure proceeds to step S111.

Processing described thus far constitutes an initial setting operation performed when the apparatus is turned on. Needless to say, a configuration may be adopted in which this initial setting operation is performed according to the operator's intention, using a reset switch or the like provided in the coordinate input apparatus. After this initial setting operation, the apparatus shifts to the normal state of coordinate input operation using a pointer (state of normal obtaining operation).

In step S111, in the coordinate input sampling state, the normal obtaining operation of the line CCD 41 is executed and pixel data (light amount distribution) is obtained. In step S112, it is determined whether pixel data has been obtained in all the sensor units 1a to 1d. If pixel data has not been obtained in all the sensor units 1a to 1d ("NO" in step S112), step S111 is repeated. Then, if pixel data has been obtained in all the sensor units 1a to 1d ("YES" in step S112), in step S113, the pixel data is compared with the reference data acquired during initialization, thereby calculating a difference value. In step S114, it is determined whether there is a light-blocked portion (input). If it is determined that there is no input in step S114 ("NO" in step S114), the procedure returns to step S111, and pixel data is obtained again. At this time, if the cycle for repeating such obtaining of pixel data is set to approximately 10 [msec], sampling is performed 100 times per second. If it is determined that there is an input ("YES" in step S114), the procedure proceeds to step S115.

Note that as described with reference to FIGS. 5A to 6E, the coordinate input effective region 3 is divided, and a combination of the sensor units 1a to 1d used for detecting a light-blocked portion is determined for each divided region. Accordingly, when an input operation has been performed, a light-blocked portion is supposed to be detected by at least two sensor units, and the sensor units that have detected the light-blocked portion are specified in step S114. If there has been no input, there is no sensor unit that has detected a light-blocked portion, and the procedure again returns to step S111, and repeats obtaining pixel data.

In step S115, it is determined whether the number of sensor units that have detected a light-blocked portion is more than two, that is, whether pointing is performed in the overlap region shown in FIG. 6D or FIG. 6E or in any other region. If pointing is performed in the overlap region ("YES" in step S115), flag is set to 1 (Flag=1). In contrast, if pointing is performed in a region other than the overlap region ("NO" in step S115), flag is set to 0 (Flag=0). In step S118, a combination of two sensor units necessary for calculating coordinates is selected.

In step S119, the pointed position (coordinate values) is calculated using angle information output by the selected two sensor units and the information on the distance between the sensor units (first calculation). Then, in step S120, it is determined whether flag is 0. If flag is 0 ("YES" in step S120), the coordinate values calculated here is output to an exterior apparatus in step S123 as final coordinate values. Then, the procedure returns to step S111.

In contrast, if flag is 1 ("NO" in step S120), there are a plurality of combinations of two sensor units with which the pointed position can be calculated, and thus it is determined in step S121 whether calculation has been finished for all the combinations. If there remains a combination of sensor units with which the pointed position can be calculated ("NO" in step S121), the procedure returns to step S118, where the pointed position is calculated again. As a result, a plurality of pointed position calculation results are present in step S122, and thus the average value, weighted average value or the like of the results is calculated as coordinate values (second calculation). Then, the calculated coordinate values are output to an external apparatus in step S123 as final coordinate values.

As described above, in Embodiment 1, stable optical output signals are acquired by the light receiving units of the sensor units, and therefore accuracy and resolution of the detected coordinate values are improved, and in addition, an excellent effect that the size of the sensor units can be reduced and thereby the size of the apparatus can be reduced is achieved. Furthermore, since it is possible to dispose constituent elements (sensor units and retroreflecting members) only at opposite sides (two sides) of the coordinate input effective region, it is possible to provide a coordinate input apparatus that has a large size or a long length and can support multiple display.

<Embodiment 2>

In the present invention, with a configuration realized by the retroreflecting members 4a and 4b provided at two sides on the outer side of the coordinate input effective region 3 and the sensor units 1a to 1d provided in the neighborhood of the ends of the retroreflecting members 4a and 4b, a coordinate input apparatus that is capable of stable light detection and thereby achieves excellent operability is provided.

As a result of adopting the configuration described above, a configuration described below also becomes possible.

Figure 9A:
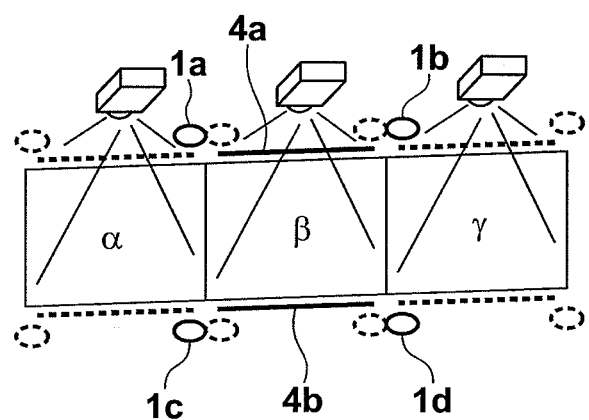
FIG. 9A illustrates Embodiment 2.

FIG. 9A shows an example in which the present invention is applied to a multiple display. Sensor units 1a, 1b, 1c and 1d and retroreflecting members 4a and 4b are provided so as to set the range of display region β as the coordinate input effective region. As shown in FIG. 9A, by providing the entirety of this configuration on both sides thereof (in FIG. 9A, constituent elements on both sides are indicated by dashed line), an interactive multiple display made up of three display screens can be realized.

"Interactive" used herein refers to a function with which display control is possible by directly touching an object displayed on the display screen, or the track of an object displayed on the display screen can be displayed by pointing the object. That is, the configuration of Embodiment 1 is used as a unit configuration, and the display screen can be expanded by joining the unit configurations. Since no blocking member such as a retroreflecting member is present in joint portions of display images, it is possible to continuously input coordinates over display screens, and thus an excellent effect that an interactive display having excellent operability can be provided is achieved.

Figure 9B:
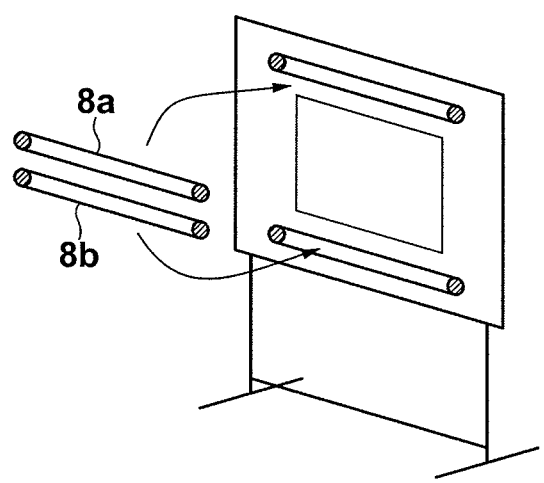
FIG. 9B illustrates Embodiment 2.
Figure 10:
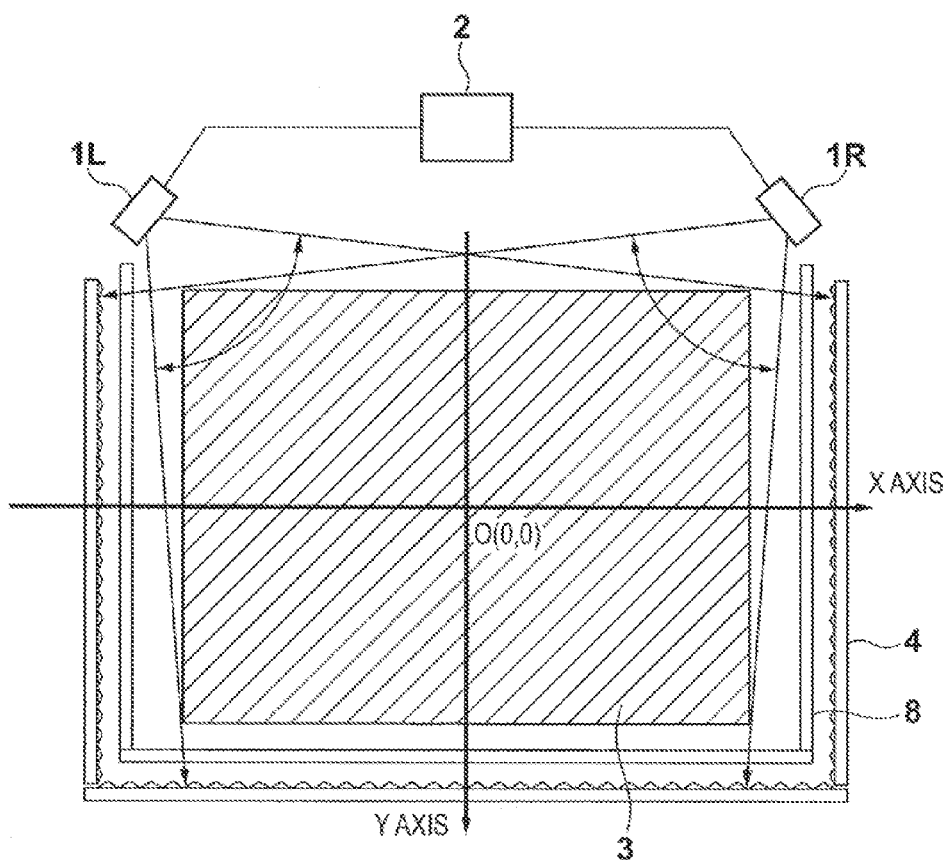
FIG. 10 schematically shows a configuration of an optical coordinate input apparatus.
Figure 11A:
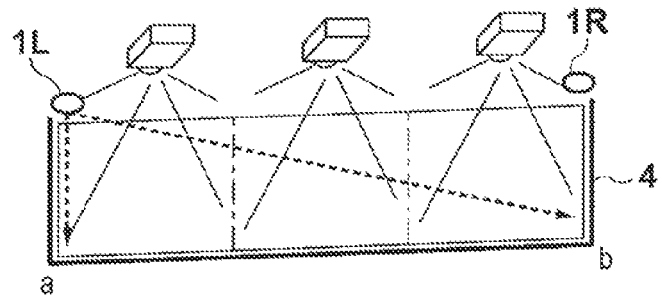
FIG. 11A illustrates a problem that occurs in the case of multiple display.
Figure 11B:
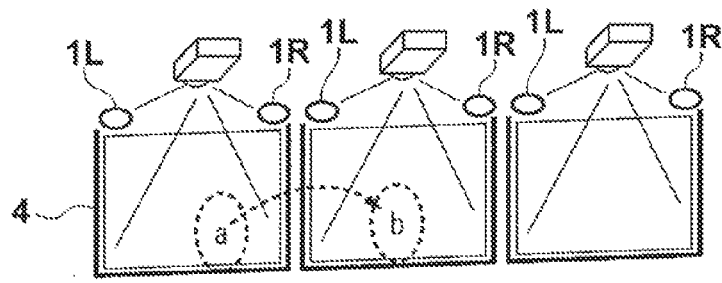
FIG. 11B illustrates a problem that occurs in the case of multiple display.
Figure 11C:
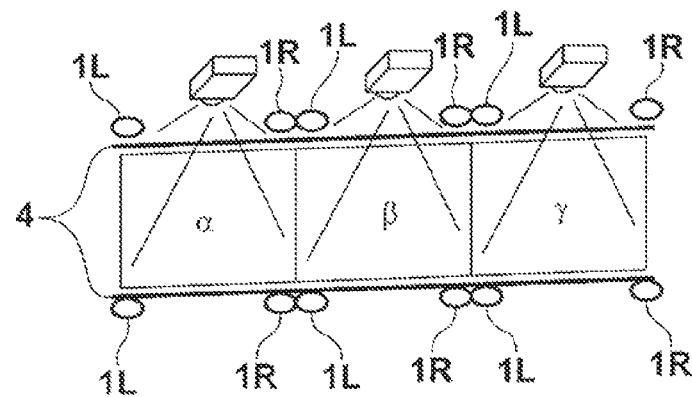
FIG. 11C illustrates a problem that occurs in the case of multiple display.
Figure 12A:
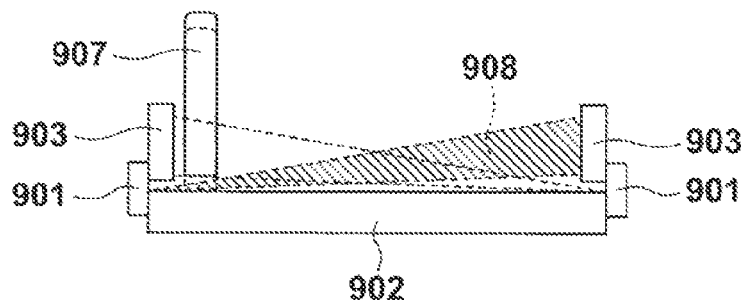
FIG. 12A illustrates a problem that occurs in the case of proximity input.
Figure 12B:
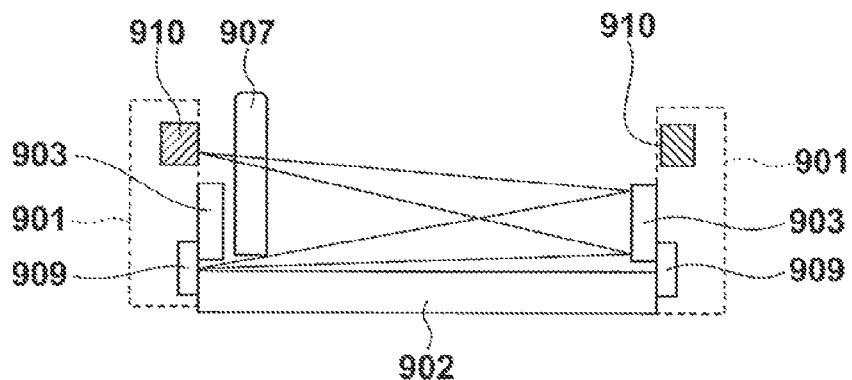
FIG. 12B illustrates a problem that occurs in the case of proximity input.
Figure 12C:
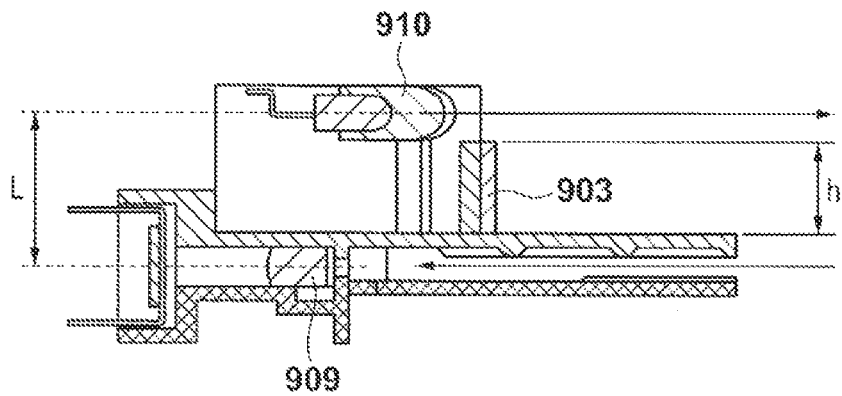
FIG. 12C illustrates a problem that occurs in the case of proximity input.

Also, constituent elements of the present invention are accommodated in two sensor bars 8a and 8b as shown in FIG. 1. Accordingly, as shown in FIG. 9B, by attaching the two sensor bars 8a and 8b to an existing white board or wall, it is possible to immediately make a display device into an interactive display device. In this case, since the number of constituent elements is only two, a user can realize an interactive display device "immediately", "readily" and "anywhere" by attaching the two sensor bars 8a and 8b. As a result, an excellent effect that user's usability is highly improved is achieved.

As described above, according to Embodiment 2, in addition to the effect described in Embodiment 1, by configuring the constituent elements of the coordinate input apparatus to be detachable from the coordinate input face, the coordinate input apparatus can be readily transported.

In other words, the size of a conventional coordinate input apparatus incorporated with a screen as a single unit increases with an increase in the size of the display screen. Therefore, the costs of management and distribution of the apparatus are large in the stages of manufacture, distribution and sales, and installation of the apparatus also requires a high cost. By adopting a configuration in which sensor portions are attached later to a display that uses an existing white board, wall or shop window as a screen, the size of the input apparatus is reduced, and thereby the cost of the apparatus can be greatly reduced. In addition, since the apparatus is configured to be portable by the user, the apparatus is used more frequently, and thus an excellent effect that usability can be improved is achieved.

The present invention can be also realized by executing the following processing, that is, processing in which software (program) realizing the functions of the foregoing embodiments is supplied to a system or an apparatus via a network or various storage media, and a computer (or CPU or MPU, etc.) of the system or the apparatus reads out a program and executes the program.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-247838, filed on Nov. 4, 2010, which is hereby incorporated by reference herein in its entirety.

What is claimed is:

1. A coordinate input apparatus comprising:
    retroreflecting units provided at two opposite sides of a rectangular-shaped coordinate input effective region; and
    a plurality of sensor units provided at the two sides, wherein each of the sensor units comprises:
        a light receiving unit adapted to receive light that reaches the light receiving unit;
        a light projecting unit adapted to project light toward a retroreflecting unit provided at one of the two sides, which opposes the light projecting unit; and
        a light emitting unit adapted to emit diffused light from a band-shaped surface, and
    wherein each of the sensor units simultaneously detects, by the light receiving unit, light that has been projected by the light projecting unit and reflected back by the retroreflecting unit provided at the side opposing the light projecting unit, and light that has been emitted by light emitting units of a plurality of sensor units provided at the side opposing the light projecting unit.

2. The coordinate input apparatus according to claim 1, further comprising a control unit adapted to cause the light projecting unit of at least one of a plurality of sensor units provided at one of the two sides, and the light emitting units of a plurality of sensor units provided at the side opposing the one of the two sides to emit light simultaneously.

3. The coordinate input apparatus according to claim 1, further comprising a control unit adapted to cause the light projecting units of all of a plurality of sensor units provided at one of the two sides, and the light emitting units of a plurality of sensor units provided at the side opposing the one of the two sides to emit light simultaneously.

4. The coordinate input apparatus according to claim 1, wherein in each of the plurality of sensor units, the light receiving unit is disposed between the light projecting unit and the light emitting unit.

5. The coordinate input apparatus according to claim 1,
    wherein each of the plurality of sensor units is provided in the neighborhood of a corner portion of the coordinate input effective region, and
    wherein in a direction of a normal to a light emitting surface of the light emitting unit of a first sensor unit, which is one of a plurality of sensor units provided at one of the two sides of the coordinate input effective region, a second sensor unit, which is one of a plurality of sensor units provided at the side opposing the one of the two sides, is provided.

6. The coordinate input apparatus according to claim 5, wherein the direction of a normal to the light emitting surface of the light emitting unit of the first sensor unit matches the direction of an optical axis of the light projecting unit of the second sensor unit.

7. The coordinate input apparatus according to claim 1, wherein upper end portions of the retroreflecting units and an upper end portion of the light emitting unit of each of the plurality of sensor units have the same height from the coordinate input effective region in a direction of a normal to the coordinate input effective region.

8. The coordinate input apparatus according to claim 1,
    wherein each of the plurality of sensor units is provided in the neighborhood of a corner portion of the coordinate input effective region, and
    wherein a field of view of the light receiving unit of a first sensor unit, which is, out of the plurality of sensor units, one of a plurality of sensor units provided at one of the two sides, overlaps a field of view of a second sensor unit, which is one of a plurality of sensor units provided at the side opposing the one of the two sides, and is disposed in a diagonal direction of the first sensor unit.

9. The coordinate input apparatus according to claim 1, further comprising:
    a determination unit adapted to determine whether a shadow generated by a coordinate input operation is detected by the light receiving units of only two sensor units of the plurality of sensor units, or the light receiving units of three or more sensor units of the plurality of sensor units;
    a first calculation unit adapted to calculate, in a case where the determination unit has determined that the shadow is detected by the light receiving units of only two sensor units, an input coordinate value based on a result of shadow detection performed by the light receiving units of the two sensor units;

a second calculation unit adapted to calculate, in a case where the determination unit has determined that the shadow is detected by the light receiving units of three or more sensor units, for each of combinations of two sensor units that can be selected from the three or more sensor units, an input coordinate value based on a result of shadow detection performed by the light receiving units of the two selected sensor units, and calculate an average coordinate value of coordinate values calculated for the combinations; and an output unit adapted to output a coordinate value calculated by the first calculation unit or the second calculation unit.

10. A method for controlling the coordinate input apparatus according to claim 1, the method comprising:

a determination step of determining whether light is detected by the light receiving units of two sensor units of the plurality of sensor units, or the light receiving units of three or more sensor units of the plurality of sensor units, with respect to a coordinate input operation;

a first calculation step of calculating, in a case where it has been determined in the determination step that light is detected by the light receiving units of two sensor units, an input coordinate value based on a result of light detection performed by the light receiving units of the two sensor units;

a second calculation step of calculating, in a case where it has been determined in the determination step that light is detected by the light receiving units of three or more sensor units, for each of combinations of two sensor units that can be selected from the three or more sensor units, an input coordinate value based on a result of light detection performed by the light receiving units of the two selected sensor units, and calculating an average coordinate value of coordinate values calculated for the combinations; and an output step of outputting a coordinate value calculated in the first calculation step or the second calculation step.

11. A non-transitory computer-readable medium storing a program for causing a computer to perform the control of the coordinate input apparatus according to claim 1, the program causing the computer to function as:

a determination unit adapted to determine whether light is detected by the light receiving units of two sensor units of the plurality of sensor units, or the light receiving units of three or more sensor units of the plurality of sensor units, with respect to a coordinate input operation;

a first calculation unit adapted to calculate, in a case where the determination unit has determined that light is detected by the light receiving units of two sensor units, an input coordinate value based on a result of light detection performed by the light receiving units of the two sensor units;

a second calculation unit adapted to calculate, in a case where the determination unit has determined that light is detected by the light receiving units of three or more sensor units, for each of combinations of two sensor units that can be selected from the three or more sensor units, an input coordinate value based on a result of light detection performed by the light receiving units of the two selected sensor units, and calculate an average coordinate value of coordinate values calculated for the combinations; and an output unit adapted to output a coordinate value calculated by the first calculation unit or the second calculation unit.

* * * * *